United States Patent
Kuhnert

[11] 3,774,900
[45] Nov. 27, 1973

[54] CLAMPING ASSEMBLY OR JIG FOR MACHINE TOOLS, MACHINING CENTERS AND TRANSFER ROUTES

[75] Inventor: Hans Kuhnert, Wiesloch, Germany

[73] Assignee: Heidelberger Druckmaschinen Aktiengesellschaft, Heidelberger, Germany

[22] Filed: June 30, 1971

[21] Appl. No.: 158,374

[30] Foreign Application Priority Data
July 2, 1970  Germany............... P 20 32 775.7

[52] U.S. Cl........................................ 269/95, 269/7
[51] Int. Cl............................................. B23q 3/02
[58] Field of Search ............... 269/95, 7; 164/333

[56] References Cited
UNITED STATES PATENTS
995,537    6/1911    Hertner et al. ................... 269/7
2,430,366  3/1945    Porterfield ....................... 269/95

Primary Examiner—Harold D. Whitehead
Assistant Examiner—James G. Smith
Attorney—Curt M. Avery et al.

[57] ABSTRACT

Clamping assembly for machine tools, machining centers and transfer routes for holding at least one workpiece in machining position includes a clamping frame of given dimensions having means for rigidly connecting the clamping frame to at least one workpiece, and a clamping device for exclusively clamping therewithin the clamping frame of given dimensions, the clamping device being secured at a location at which the workpiece is to be machined in a manner that the workpiece clamped in the clamping frame is oriented in a given position for machining thereof.

21 Claims, 10 Drawing Figures

PATENTED NOV 27 1973 3,774,900

CLAMPING ASSEMBLY OR JIG FOR MACHINE TOOLS, MACHINING CENTERS AND TRANSFER ROUTES

The invention relates to jig or clamping assembly for machine tools, machining centers and transfer routes for holding one or more workpieces in machining position.

Heretofore known clamping devices for firmly clamping a blank or piece of stock in the machining location of processing machines, such as machine tools, have always been matched to the contours of the workpieces. Generally, for workpieces that are to have surfaces machined on various sides thereof or that are to be formed with bores extending in different directions therein, a separate clamping device or jig is required for every angular position in which such surfaces or bores are found on or in the workpiece. Moreover, "floating clamping stresses" must often be applied in order not to deform the workpiece when clamping the same.

Exclusively tying up several complex clamping devices with a single type of workpiece is very costly. This expense is then increased markedly if special precautions must be taken because of the danger of deformation of the workpiece when it is tightly clamped. Since workpieces are clamped only indirectly with the heretofore known clamping devices due to this problem, it is also impossible, as a rule, to completely machine the workpieces in the course of one clamping step, starting with the raw stock or blank. A multiplicity of storage periods, preparation periods and clamping periods consequently develop.

It is especially disadvantageous when employing the heretofore known clamping devices that, whenever a machine tool is made ready for finishing different workpieces, a shut-down interval occurs because the previously used clamping device must be replaced by another clamping device which is accommodated to or matches the contour of the new workpiece that is to be machined.

It is accordingly an object of the invention to provide a clamping assembly which does not clamp a workpiece directly and which thereby preserves the workpiece, which moreover permits the blank or stock member to be completely machined in the course of one clamping step, and which affords the use of a single clamping device for a series of differently formed workpieces.

With the foregoing and other objects in view, there is provided in accordance with the invention, clamping assembly for machine tools, machining centers and transfer routes for holding at least one workpiece in machining position comprising a clamping frame of given dimensions having means for rigidly connecting the clamping frame to at least one workpiece and a clamping device for exclusively clamping therewithin the clamping frame of given dimensions, the clamping device being secured at a location at which the workpiece is to be machined in a manner that the workpiece clamped in the clamping frame is oriented in given position for machining thereof.

Workpieces of the same or different shape can be secured in such a clamping frame. Likewise, workpieces of varying dimensions and calling for different machining programs can be held in machining position by one and the same clamping device according to the invention. Time-consuming exchange of clamping devices every time the machine tool is made ready for a different type of workpiece is thereby dispensed with. It is especially advantageous that the standardized dimensions of the clamping frame promote an automatic loading operation as well as an automatic selection of the workpieces. Also, the workpiece is capable of being completely machined after being once secured in position in the clamping frame. Danger of deformation of the workpiece due to repeated clamping thereof is thereby eliminated. The workpieces are, for example, rigidly connected to the clamping frame by crosspieces, which are severed directly at the surface of the workpiece after the machining operation or operations performed thereon are completed.

In accordance with a further feature of the invention, information carriers are provided on the clamping frame or on the workpieces secured thereto, so as to identify the workpieces, for example, for the purpose of sorting out or separating them, for an automatic loading operation or for an automatic selection of the desired machining program.

When using heretofore known clamping assemblies or jigs, the varied geometric shape of the workpieces normally does not permit automatic sorting, recognition and feeding of the parts at machining locations. Only loading and sorting devices have been known heretofore that are coordinated or adjusted especially to the outer dimensions of a specific workpiece or a geometrically similar family of workpieces. The application of a workpiece code directly to the workpiece and the reading thereof directly therefrom, when using different kinds of workpieces, depends upon the fact that at least a part of the outer contour of all of the workpieces is the same. Since such a condition did not exist in practice, direct marking of the workpieces has heretofore met with great difficulties.

The standardized shape of the clamping frame according to the invention as well as the possibility of always coordinating at a specific level of the clamping frame, selected workpiece surfaces or areas provided with a suitable identification, permits the application of identification marks both on the clamping frame as well as on the workpiece. The automatic sorting and feeding of the workpieces as well as the recognition of the identification are exceptionally simplified thereby.

In accordance with an additional feature of the invention, the clamping frame and the workpiece together are in the form of an integral member produced by molding or forging. Especially when the integral member is formed by a molding operation, the clamping frame components can be re-used later and are consequently not wasted.

In accordance with an added feature of the invention, the workpieces are secured to the clamping frame by being sealed in a thermoplastic synthetic material therewith. Furthermore, the clamping frame proper may be made of an especially durable thermoplastic synthetic material. The possibility also exists to provide, in accordance with the invention, a rigid connection with crosspieces of thermoplastic synthetic material between a metal clamping frame and the workpiece. This latter embodiment provides to be especially advantageous if workpiece blanks or stock members are to be machined which are able to be secured to a clamping frame only with great difficulty by molding or forging processes.

Other features which are considered as characteristic for the invention are set forth in the appended claims.

Although the invention is illustrated and described herein as embodied in clamping assembly or jig for machine tools, machining centers and transfer routes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 3:
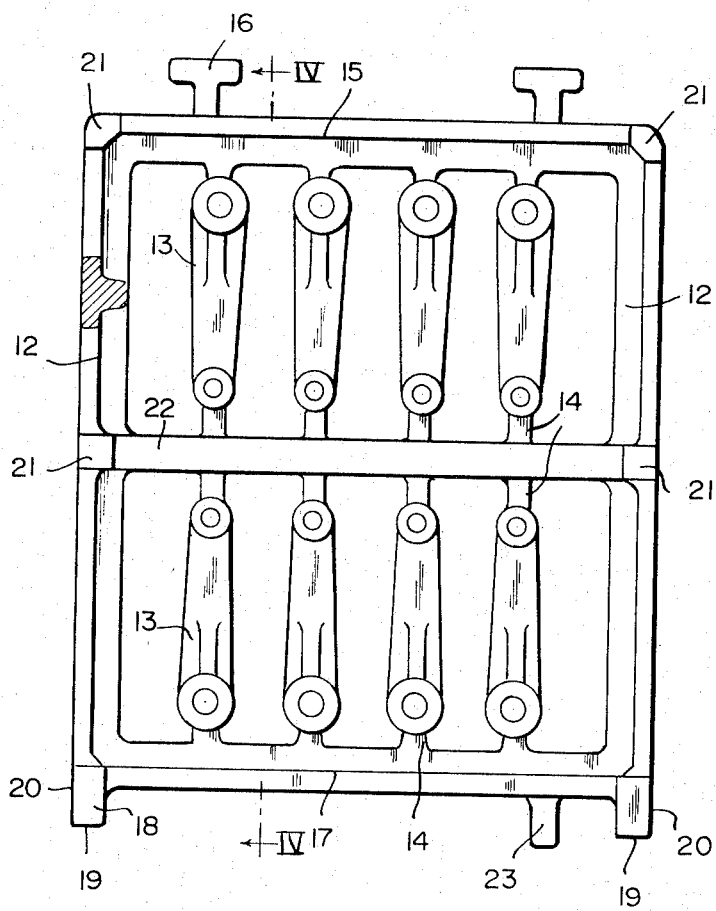
FIG. 3 is a top plan view of another embodiment of the clamping frame having a rectangular shape.
Figure 4:
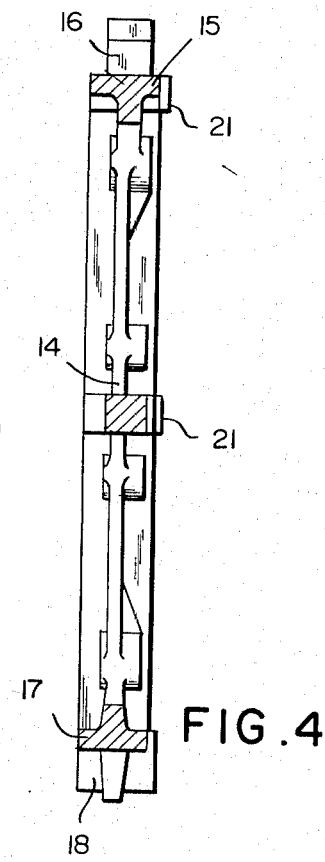
FIG. 4 is a sectional view of FIG. 3 taken along the line IV — IV in the direction of the arrows.
Figure 5:
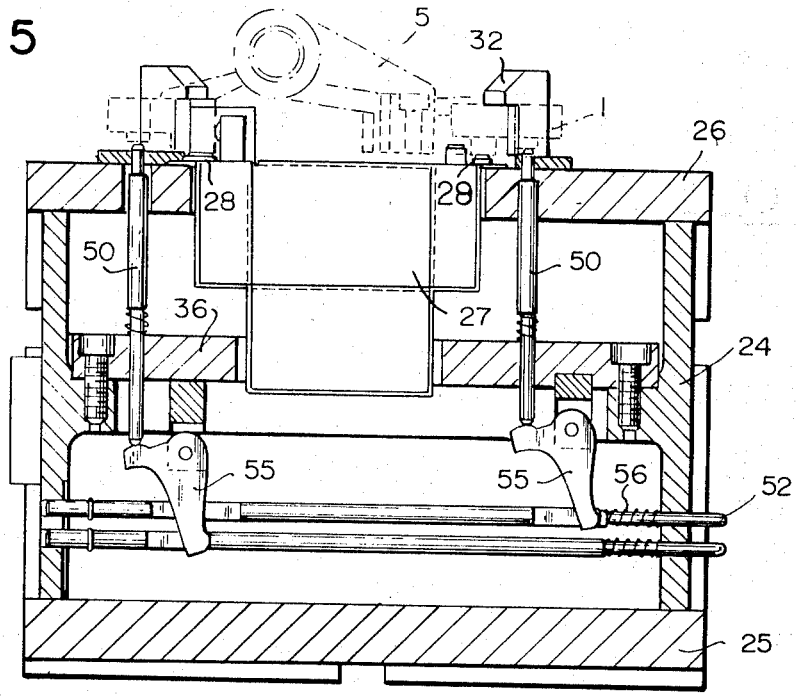
FIG. 5 is a sectional view of FIG. 6 taken along the line V — V in the direction of the arrows.
Figure 6:
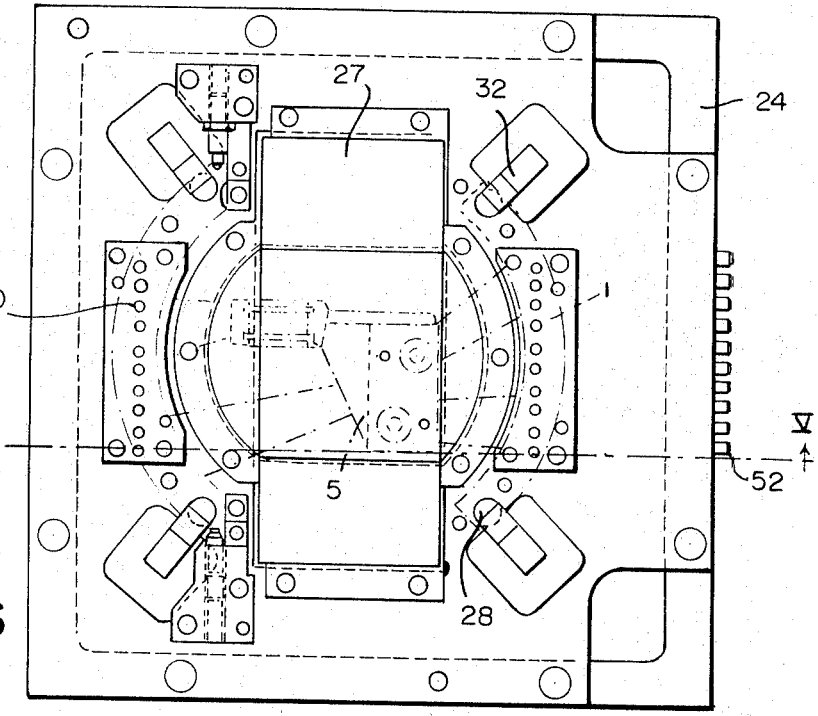
FIG. 6 is a top plan view of a clamping device for receiving clamping frames having the shape shown in FIGS. 1 and 2.
Figure 7:
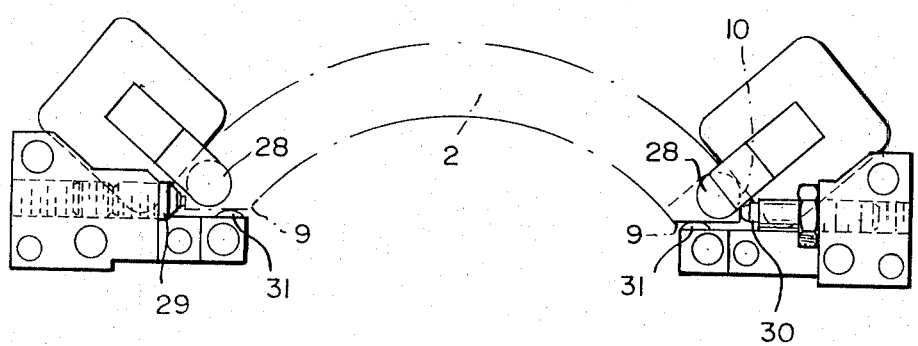
FIG. 7 is a top plan view of an alignment device for clamping frames of the type shown in FIGS. 1 and 2.
Figure 8:
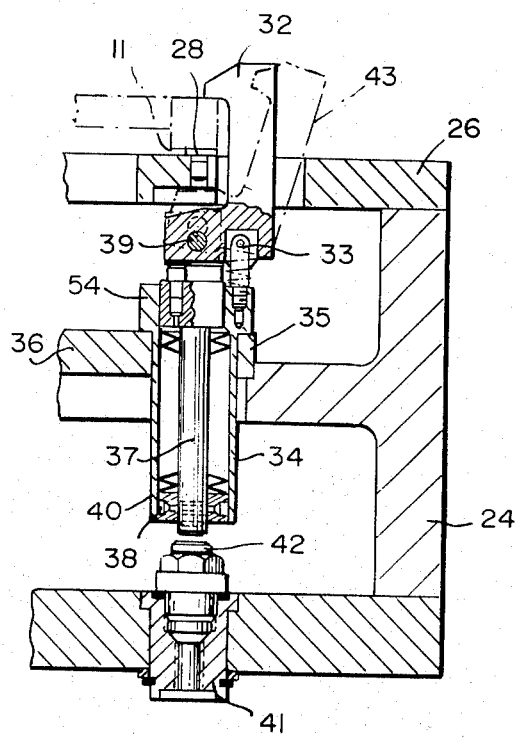
Figure 9:
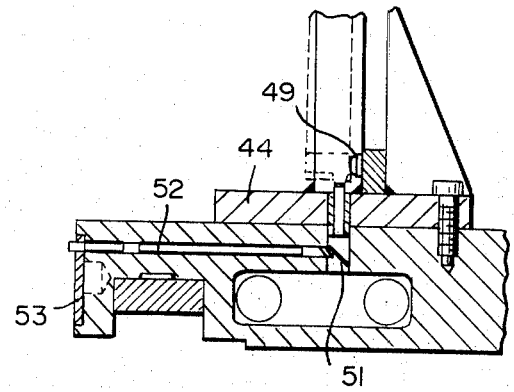
Figure 10:
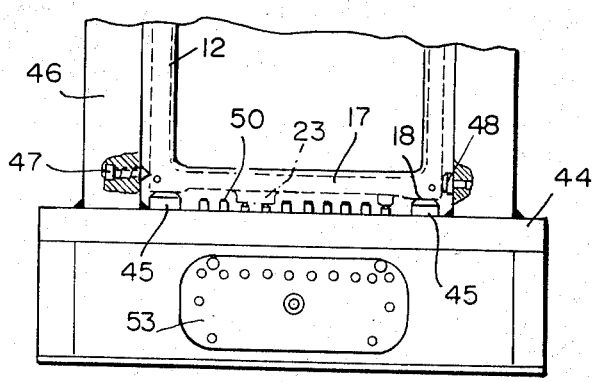

FIG. 8 is a view partly in section of a clamping lever for the clamping device according to FIGS. 5 and 6; and FIGS. 9 and 10 are details of a clamping device for receiving clamping frames of the type shown in FIGS. 3 and 4.

Figure 1:
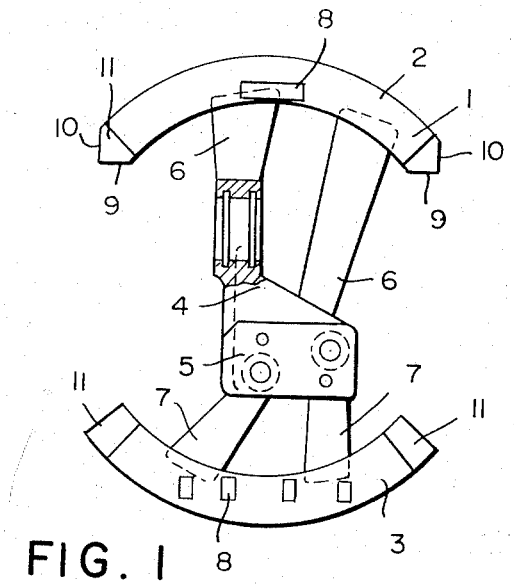
FIGS. 1 and 2 are top plan and elevational views, respectively, of a clamping frame according to the invention which is formed of two arcuate clamping members.
Figure 2:
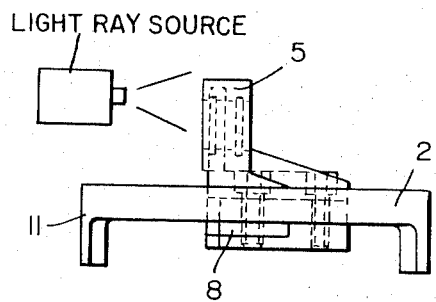

Referring now to the drawings and first particularly to FIGS. 1 and 2 thereof, there is shown therein a clamping frame 1 constructed in accordance with the invention which is formed of two arcuate clamping members 2 and 3 having radially outer surfaces that are equally spaced from a center point 4 of the clamping frame 1. A workpiece in the form of a bearing block 5 is disposed between the clamping members 2 and 3. Two crosspieces 6 connect the bearing block 5 to the upper clamping member 2, as shown in FIG. 1. A corresponding connection is provided by two additional crosspieces 7 located between the bearing block 5 and the lower clamping member 3, as shown in FIG. 1. After the bearing block 5 is completely machined, the crosspieces 6 and 7 are then severed directly at the surface of the bearing block workpiece 5. The severing operation can be effected, for example, by sawing, milling, stamping, melting off or also by gas-cutting.

Information cams or pins 8 for identifying the bearing block 5 carried by the clamping frame 1 are provided at the underside of both clamping members 2 and 3. They represent a four-place keyed numeral. The recognition of the bearing block 5 can be sensed by means of conventionally known identification switches and may be used for introducing a machining program appertaining to the workpiece.

For the purpose of aligning or orienting the clamping frame 2 in the plane in which the clamping stresses are directed, the clamping frame 2 is provided with two aligning surfaces 9 and 10 which are disposed perpendicularly to one another. Moreover, both clamping members 2 and 3 are provided at the ends thereof with a respective seat or support 11, the four seats or supports 11 are machined in common, thereby the level of the workpiece, the bearing block 5 in the case at hand, with respect to the clamping surface, is established exactly.

The embodiment illustrated in FIGS. 1 and 2 shows the disposition of only one workpiece, namely the bearing block 5 between the clamping members 2 and 3. Just as well, several similar or dissimilar smaller workpieces could be mounted in the clamping frame 1 and connected by suitable crosspieces to the clamping members 2 and 3. Care must only be taken that the shape of the clamping members 2 and 3, as well as the additional diameter of the clamping frame 1 always remain the same and that the workpieces are connected by means of crosspieces so that they are adequately stable with respect to the clamping frame 1 for the machining operation.

The second embodiment of the clamping frame of the invention is shown in FIGS. 3 and 4. The clamping frame 12 of the second embodiment is rectangular and is closed upon itself. It surrounds eight similar workpieces formed as levers 13. In the clamping frame 12, differently formed workpieces can just as easily be mounted.

The levers 13 are rigidly connected to the ends thereof through crosspieces 14 to transverse crosspieces 15, 17 and 22 of the clamping frame 12. Since the clamping frame 12 is supposed to be clamped in a vertical plane at the operating location of a machining tool, two loading arms 16 are provided at the upper transverse crosspiece 15 thereof which permits the transport of the clamping frame 12 into a loading device. At the ends of the lower transverse crosspiece 17 of the clamping frame 12, a respective support 18 is provided having abutment surfaces 19 as well as outer surfaces 20 for aligning the clamping frame 12 in the clamping plane. Besides the transports 18, four additional transports 21 are also provided. All of the transports 18 and 21 are machined at their abutment surfaces and determine the spacing of the lever 13, which is to be machined, from the clamping surface. A recognition or identification is coordinated also with the clamping frame 12. It is formed of the identification cam or pin 23 which is molded to the lower transverse crosspiece 17 of the clamping frame 12, shown in FIG. 3. It carries all the information provided for the selection of the machining program coordinated to the lever 13. Additional cams or pins can be molded at the same transverse crosspiece 17 for automatic sorting and feeding of the clamping frame 12. For these or similar clamping frames, especially matching clamping devices must be provided in the machining locations of machine tools or the like or on pallettes. The clamping device according to FIGS. 5–8 can, for example, only accommodate clamping frames 1 having a specific diameter and specific shape of the clamping members 2 and 3.

The clamping device shown in FIGS. 5 and 6 is made up of a rectangular molded housing 24, which is closed at the rear thereof by a base plate 25, and in the front thereof by a cover 26. The cover 26 carries all of the alignment parts. It is provided in the workpiece machining zone with a recess 27 above which the clamped workpiece or workpieces are located. As shown in phantom, the bearing block 5 is disposed momentarily in machining position. The alignment for orientation of this workpiece 5 occurs when the clamping frame 1 is inserted. At that time, the supports or seats 11 of the clamping members 2 and 3 become seated on the bearing bolts or pins 28. The level of the bearing block 5 with respect to the clamping plane or surface is thereby determined. A spring bolt 29 biases the inserted clamping member 2 with the aligning surface 10 thereof in parallel direction against an adjusting screw 30 while the aligning surfaces 9 simultaneously come into engagement with stops 31, as is apparent especially from FIG. 7.

Each of the bearing pins or bolts 28 is coordinated with a clamping lever 32. The clamping levers 32 press the supports or seats 11 against the bearing pins or bolts 28 after the clamping frame has been inserted and aligned. As is visible from FIG. 8, the clamping levers 32 are pivotably held by a bearing 33 which is provided in a collar 54 formed on a sleeve or bushing 34. The bushing 34 is firmly driven into a bore of a center plate 36. In the bushing 34, there are located plate springs 40 through which a tie rod 37 extends, which has a lower end carrying a piston 38 which slides in the bushing 34. The plate springs 40 are braced on the piston 38. The upper end of the tie rod 37 extends through the collar 54 of the bushing 34 and is articulatingly connected through a pin 39 to the clamping lever 32. The plate springs 40 draw the tie rod 37 downwardly whereby the clamping lever 32 is pivoted counterclockwise, as shown in FIG. 8, about the bearing 33 in the withdrawn position 43 shown in phantom in FIG. 8. The plate springs 40 act so that the lever 32 forces the supports or seats 11 of the clamping frame 1 firmly against the bearing pins or bolts 28 so that the clamping frame 1 attains a seat which is sufficiently rigid for carrying out the machining operation.

In the base plate 25 there is located, axially to the tie rod 37, a hydraulic or oil pressure connection 41 with a piston 42 which is displaceable upwardly by oil pressure upon impact. When subjected to the oil pressure, the piston 42 presses against the lower end of the tie rod 37 and pivots the clamping lever 32 clockwise against the force of the plate springs 40 into the phantom position 43 thereof so that the clamping frame 1 can be removed.

Springy sensing cams or pins 50 extend through the cover 26 of the clamping device in the vicinity of the clamping members 2 and 3. At the lower end of the sensing cams 50, they press against a shift lever 55 which in turn actuates a horizontally extending answering cam or pin 52 against the force of the spring 56. At a location desirable for the answering of the code of the workpiece to be machined, the answering cams or pins 52 project laterally out of the molded housing 24 of the clamping device according to FIGS. 5 and 6. If an answering cam or pin 52 is actuated through an information cam 8 upon the insertion of a clamping frame 1, a corresponding displacement of the coordinated answering cam or pin 52 out of the molded housing 24 occurs through the shift lever 55. A nonillustrated answering device senses the raised cam or pin 52 and transmits the thus obtained information to a control center.

A clamping device for a rectangular clamping frame 12 according to FIGS. 3 and 4 is shown in details in FIGS. 9 and 10. On the cover plate 44 of the clamping device of FIGS. 9 and 10, all of the aligning or orienting parts are again located. The supporting surfaces 19 of the supports 18 of the clamping frame 12 are placed on the pins or bolts 45 when the clamping frame is inserted. An aligning or orienting pin or bolt 47 resiliently mounted in the lateral wall 46 presses the clamping frame 12 against the stop 48. The bearing surfaces of the supports 18 and 21 of the clamping frame 12 come into engagement with the bearing pins or bolts 49. The information cams or pins 23 located at the lower traverse crosspiece 17 of the clamping frame 12 actuate the respectively opposing sensing cams or pins 50 during the clamping operation. The sensing cams or pins 50 are spring-loaded and are provided at the lower end thereof with an inclined surface. The sensing cams or pins 50 slide similarly springy answering cams or pins 51 over these inclined surfaces 51 in horizontal direction out of the clamping device. The nonillustrated answering device senses the answering cams or pins 52, outwardly projecting in the vicinity of the answering surface 53, and transmits the information to a computing center. Also, with this clamping device, the clamping levers and their control means can be constructed as shown schematically in FIG. 8.

As mentioned hereinbefore, the invention is not restricted only to the embodiments shown and described herein. Thus, the clamping frame does not absolutely have to be a frame which surrounds the workpieces that are to be clamped. It is also possible to have a clamping member in front of which a relatively large workpiece is located, which is connected to the clamping member through several horizontally extending cross-pieces. Especially in the case of such an embodiment but also in the frame-like version, the clamping frame together with the clamping device can be placed in rotation at the machining location, in order to carry out machining with a rotary tool of a workpiece or workpieces held by the clamping frame.

The information carrier provided in the clamping frame can be produced by forging or by chip-cutting machining operation besides the aforementioned molding operation. Furthermore it is possible to construct the cams or pins so that they are threadedly securable or attachable. Also, instead of cams or pins, bores can be formed in the clamping frame or in the workpiece as informations carriers. In addition, the recognition or identification of the workpiece need not be effected in a mechanical manner. Rather, it is also conceivable to recognize or identify a workpiece optically, for example, with the aid of a colored mark or by means of reflectors provided at the frame or workpiece, or magnetically by magnetizing specific surfaces.

It is also possible to employ the disposition of the workpieces in the clamping frame so that the contour of the workpiece or a specific section thereof is used as information carrier for identifying the respective workpieces. The sensing of the workpiece contour can be effected, for example, optically by means of light rays, as shown diagramatically in FIG. 2.

It is especially advantageous if the information applied to the clamping or to the workpiece held in front thereof is varied or erased during the machining operation or thereafter. The erasure can be employed for indicating the machining condition. The variation of the code is desirable if the workpiece completely machined in the clamping frame is to be automatically selected, transported or stored. These operations can be introduced by the application of another coding.

It is sometimes necessary to divide the entire machining operation of a complicated workpiece into several machining sections. Then, after completing a machining section, the coding at the clamping frame must naturally be varied so that for repeated or renewed clamping of this clamping frame, the machining program, coordinated with the next succeesing machining section, is repeated or recalled by a computer on the basis of a new coding.

The variation or erasure of the information can be effected mechanically in that, for example, the molded information cams or pins attain a different shape by subsequent machining or are removed entirely. When using a magnetic code, the magnetization of the surfaces provided therefor should be either varied or erased.

I claim:

1. Clamping assembly for machine tools, machining centers and transfer routes for holding at least one workpiece in machining position comprising a clamping frame of given dimensions having connecting means in the form of relatively thin bridging members for rigidly connecting said clamping frame to at least one workpiece, said clamping frame, connecting means, and workpiece being integrally formed as one piece, and a clamping device for exclusively clamping therewithin said clamping frame of given dimensions, said clamping device being secured at a location at which the workpiece is to be machined in a manner that the workpiece in said clamping frame is oriented in given position for machining thereof.

2. Clamping assembly according to claim 1 including information carrier means secured to said clamping frame for identifying the workpiece connected thereto.

3. Clamping assembly according to claim 1 including information carrier means securable to the workpiece for identifying the same.

4. Clamping assembly according to claim 1 wherein said clamping frame, connecting means and the workpiece constitute a unitary casting.

5. Clamping assembly according to claim 1 wherein said clamping frame, connecting means and the workpiece constitute a unitary forging.

6. Clamping assembly according to claim 1 including thermoplastic synthetic material meltable about the workpiece for securing the same to said clamping frame.

7. Clamping assembly according to claim 1 wherein said clamping frame is of integral construction.

8. Clamping assembly according to claim 1 wherein said clamping frame is made up of a plurality of members.

9. Clamping assembly for machine tools, machining centers and transfer routes for holding at least one workpiece in machining position comprising a clamping frame of given dimensions having means for rigidly connecting said clamping frame to at least one workpiece, and a clamping device for exclusively clamping therewithin said clamping frame of given dimensions, said clamping device being secured at a location at which the workpiece is to be machined in a manner that the workpiece clamped in said clamping frame is oriented in given position for machining thereof, said clamping frame comprising two diametrically opposing, arcuate clamping members having two cross pieces, respectively, extending therefrom for securing a workpiece therebetween, one of said clamping members being formed with two mutually perpendicular alignment surfaces for orienting the clamping frame in a plane of the clamping frame, and support means machined in common on both of said clamping members for supporting said clamping frame on said clamping device.

10. Clamping assembly according to claim 9 including information pins secured to said clamping frame for identifying the workpiece and automatically coordinating a given machining program therewith are carried by both of the clamping members of said clamping frame.

11. Clamping assembly according to claim 1 wherein said clamping frame is of closed rectangular shape adapted to hold therewithin two rows of substantially similar elongated workpieces, and including cross pieces respectively connected firmly to a part of said clamping frame and to the ends of the workpieces, and information pins located at outer surfaces of said clamping frame for automatically selecting a given machining program.

12. Clamping assembly according to claim 9 wherein said clamping device is formed with a clamping surface matching the shape of said clamping frame, and including adjusting means located on said clamping surface for automatically orienting said clamping frame through said alignment surfaces and said support means, and a plurality of spring-loaded clamping levers for tightening said clamping frame mounted in vicinity of said clamping surface, said clamping levers being hydraulically releasable.

13. Clamping assembly according to claim 12, including a series of spring-loaded sensing pins located at said clamping device in vicinity of said clamping surface, at least some of said sensing pins being engaged by the information pins of said clamping frame when the latter is clamped in said clamping device.

14. Clamping assembly according to claim 13, including deflecting means located within said clamping device and coupled to said sensing pins, said deflecting means being actuable by the respective sensing pins engaged by said information pins and being adapted to transmit information coordinated with said clamping frame to a given location of said clamping device suitable for answering the same.

15. Clamping assembly according to claim 2, wherein said information carrier means are alterable to alter the information given to said clamping frame during machining of a workpiece carried by said clamping frame.

16. Clamping assembly according to claim 2, wherein said information carrier means are alterable to alter the information given to said clamping frame after at least part of the machining of a workpiece carried by said clamping frame is completed.

17. Clamping assembly according to claim 15, wherein said information carrier means are alterable to erase the information thereon.

18. Clamping assembly according to claim 16 wherein said information carrier means are alterable to erase the information thereon.

19. Clamping assembly according to claim 1, including means comprising a source of light rays cooperating with a contour of the workpiece for identifying a workpiece carried by said clamping frame.

20. Clamping assembly according to claim 1 wherein said clamping frame comprises at least two separated parts.

21. Clamping assembly according to claim 1 wherein said connecting means comprises thin bridging members extending between each workpiece and the clamping frame.

* * * * *